Aug. 19, 1958 W. M. BROOKS 2,847,675
SEALING TOOL
Original Filed July 1, 1953 2 Sheets-Sheet 1
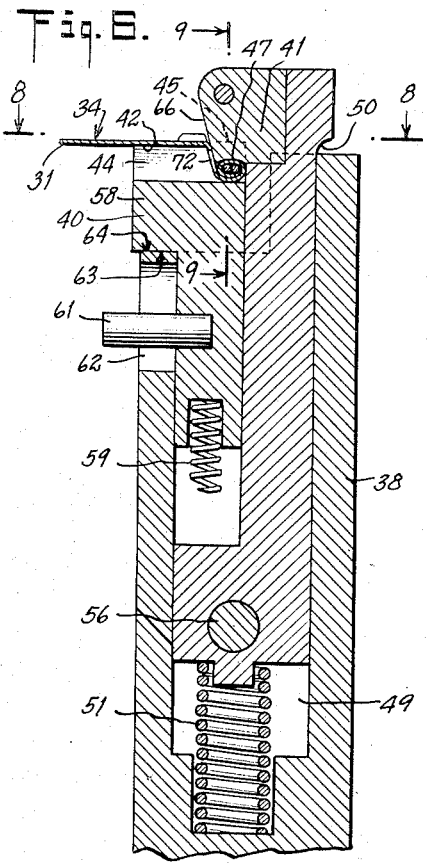
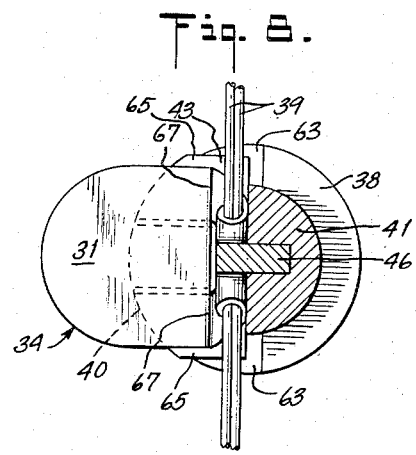
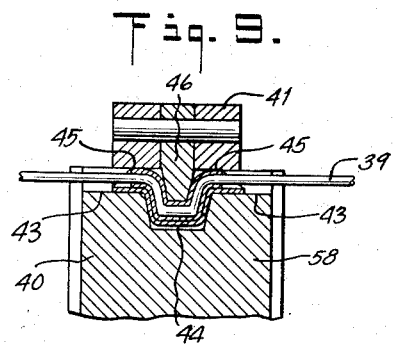
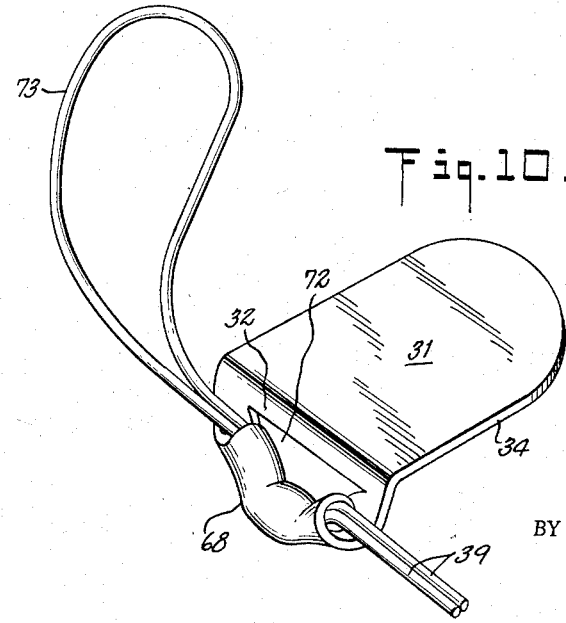
INVENTOR.
WINFRED M. BROOKS
BY
ATTORNEY

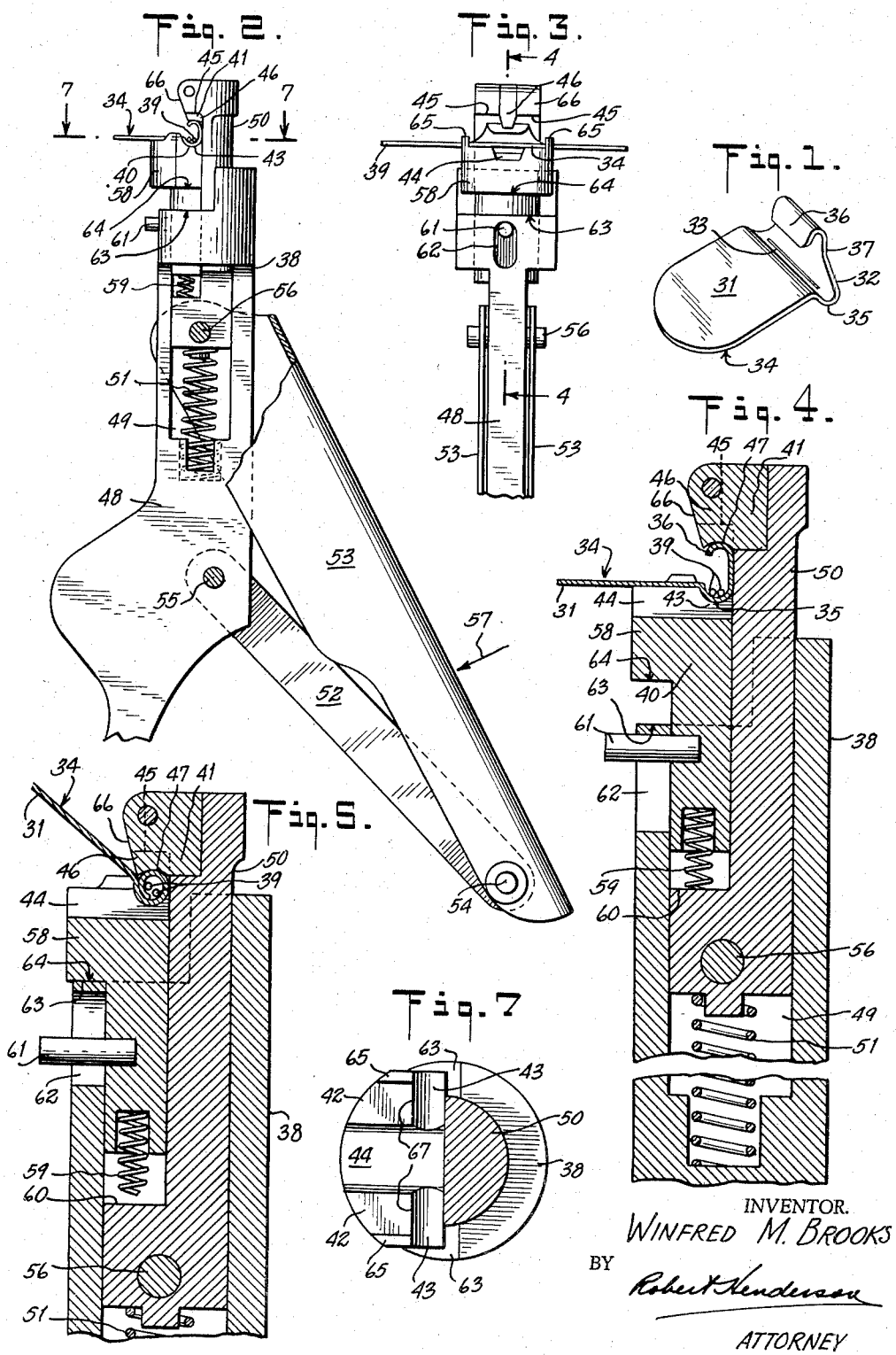

United States Patent Office 2,847,675
Patented Aug. 19, 1958

2,847,675

SEALING TOOL

Winfred M. Brooks, West Orange, N. J., assignor to E. J. Brooks Company, Newark, N. J., a corporation of New Jersey Original application July 1, 1953, Serial No. 365,488, now Patent No. 2,796,278, dated June 18, 1957. Divided and this application April 10, 1957, Serial No. 651,997

5 Claims. (Cl. 1—215)

This invention relates to a sealing tool, more particularly, a tool which is employed to close a seal of sheet material about or upon a shackle or other member to prevent opening or release of such a shackle or other member without leaving evidence thereof.

This application is a division of my copending application, Serial No. 365,488, which was filed July 1, 1953, now Patent No. 2,796,278, issued June 18, 1957.

The principal object of this invention is the provision of such a sealing tool which is relatively simple, easy to operate, and which gives to a seal closed thereby a novel character which renders the seal an improvement over previously known seals.

In the accompanying drawings:

Figure 1 is a perspective view of a seal as furnished by a seal manufacturer to a user, said seal being formed of sheet material (preferably sheet metal) and of a character enabling it to be closed by a sealing tool according to this invention.

Fig. 2 is a side elevational view of an improved sealing tool according to a preferred one of a number of possible embodiments of this invention, certain portions being broken away more clearly to show underlying parts.

Fig. 3 is a front elevational view of the tool shown in Fig. 2 as viewed from the left side of the latter figure.

Fig. 4 is an enlarged, vertical sectional view substantially on the line 4—4 of Fig. 3.

Fig. 5 is a view similar to Fig. 4, showing coiling of the sheet-metal seal at an intermediate stage of closing thereof upon a shackle.

Fig. 6 is a view similar to Figs. 4 and 5, showing, however, the completion of the closing of the seal upon the shackle.

Fig. 7 is a horizontal sectional view of the sealing tool substantially on the line 7—7 of Fig. 2, the seal and the shackle, however, being omitted.

Fig. 8 is a horizontal sectional view substantially on the line 8—8 of Fig. 6.

Fig. 9 is a vertical sectional view, substantially on the line 9—9 of Fig. 6.

Fig. 10 is a perspective view of the seal, fully closed upon the shackle.

The seal identified as 34, and shown in Fig. 1 in the form in which the seal manufacturer supplies it to the user, consists of a main portion 31 and wing portion 32. The wing portion is composed of two spaced-apart, oppositely facing, partly curled end sections 35 and 36, one of which, 35, is of larger diameter than the other, is connected to main portion 31 and has an intermediate weakened zone 33 extending part-way longitudinally thereof. Said end sections 35 and 36 are connected at one side by an intermediate section 37 that extends substantially at right angles to main portion 31. The user, having at his disposal a sealing tool according to the present invention, inserts the seal 34 into said tool, then introduces a shackle of strand material 39 into curled end section 35 and operates the sealing tool to close the seal upon the shackle.

Within this invention, the sealing tool can be actuated in any suitable way, such as by compressed air, but it is illustrated herein as designed for manual operation.

The illustrated sealing tool 38 is provided with opposed die members 40 and 41 for the reception of the seal 34. Die member 40 is provided with a pair of supporting ledges 42 and a pair of curved seats 43, the units of each of said pairs being separated by a central channel 44. Die member 41 has a pair of coil-engaging surfaces 45 complementary to the lower pair of curved seats 43. The tool includes a central punch 46 carried by upper die member 41 and located intermediate the upper pair of coil-engaging surfaces 45 in the plane of channel 44 of the lower die member. Said punch extends below said coil-engaging surfaces 45 and has a curved undersurface 47.

Suitable means to move one of said die members 40 and 41 with relation to the other are provided. In the present instance, 48 is a supporting member having an internal guide 49. Die member 41 is carried by a slide 50 that travels in guide 49. A spring 51, anchored in the bottom of guide 49, is provided, which spring tends to move slide 50 in an upward direction, as viewed in Fig. 2. 52 and 53 are a pair of levers pivotally connected together at 54, one of said levers, 52, being pivotally supported at 55 on supporting member 48, while lever 53 is pivotally connected at 56 to slide 50.

It will be understood that, when lever 53 is swung in the direction indicated by arrow 57 of Fig. 2, slide 50 will move in a downward direction. Die member 40 is carried by a slide 58, also mounted in guide 49, and is normally moved into its upward position by a spring 59 bearing against a portion 60 of slide 50. Spring 59 is much weaker than spring 51, and the said upward movement of slide 58 is limited by means of a pin 61, extending into slot 62 of supporting member 48.

The downward movement of slide 50 is transmitted to slide 58 by the interposed seal 34. Supporting member 48 is provided with an abutment surface 63 that stops the downward movement of slide 58, which latter engages said surface 63 with its surface 64. Therefore, on the continued downward movement of slide 50, slide 58 will stand still while slide 50 continues such downward movement, and will cease to support spring 59.

The manner in which the tool closes seal 34 will now be described. The operator retracts slide 58 downwardly against the tension of spring 59 so as to admit of the insertion of seal 34 between die members 40 and 41. In so doing, the operator will place curled end section 35, of wing portion 32, in the curved seats 43 and with upper curled end section 36 beneath punch 46, body portion 31 being placed on supporting ledges 42 between side gauges 65. Die member 40 is now released by the operator and spring 59 moves slide 58 upwardly so as to hold the sealing element between the die members.

Strand material 39 can now conveniently be placed in lower curled end section 35. The operator now grasps supporting member 48 and lever 53, thereby moving them toward each other. The movement thus produced causes slide 50, carrying die member 41, to move downwardly and to transmit this motion through the instrumentality of seal 34 to die member 40 and slide 58. This motion continues until surface 64 of slide 58 engages surface 63 of supporting member 48 when the downward motion of slide 58 ceases, while the downward motion of slide 50 continues.

The downward motion of slide 50 causes center punch 46 to begin the coiling of wing portion 32 of the seal. In so doing, main portion 31 will rise from its horizontal position until it engages the tip of punch 46 (Fig. 5). It will be observed that, in thus rising, main portion 31 closes the gap between curled end sections 35 and 36, thereby trapping, or ensuring the retention of, strand material 39 within wing portion 32.

Further downward motion of die member 41 causes center punch 46 to continue the coiling operation and to engage the inner surface of lower section 35 to tear said wing portion 32 in its weakened zone 33 and to crimp the central part of the coil. Eventually coil-engaging surfaces 45 of die member 41 act upon opposite ends of the coil to flatten the same, this being made possible by the breaking through of punch 46 into central channel 44.

During the foregoing movements, tapered face 66 of the die 41 pinches wing portion 32 against curved seats 43 at the place indicated by 67, and main portion 31 of the seal 34 relapses to its original horizontal position. It is to be noted that neither center punch 46 nor the crimped portion of the coil reaches the bottom of channel 44 (Figs. 8 and 9).

The seal, as closed by the tool, is shown in Fig. 10 which illustrates the fact that as a result of the described operation of the tool, the curled end section 36 and a substantial part of the curled end section 35 of the seal, as supplied to the user by the manufacturer, have been rolled and crimped into a shackle-gripping coil 68, and the tearing of wing portion 32, as described, has formed a gap 72 in the seal.

It will be understood from the foregoing that if it is attempted to undo coil 68 of the closed seal, it will be practically impossible to do so without causing a rupture of wing portion 32. This is so because the presence of gap 72 leaves very little metal, at either of its ends, connecting main portion 31 with wing portion 32. Furthermore, it will be seen that if wing portion 32 is thus ruptured, strand material 39 will still be held firmly by coil 68, and evidence of tampering will be clearly indicated. In addition, the fragile appearance of the seal, gap 72 being clearly visible, will have a tendency to deter a would-be tamperer from an attempt to open the seal.

From Fig. 10, it will be understood that strand material 39 has previously been threaded through an object to be sealed (not shown) and formed into a loop 73 in a well-understood manner.

It should be clear to those familiar with this art that the disclosed tool is simple, easy to operate and, in a single operation thereof, not only closes a seal upon a shackle but deforms and tears the seal to so weaken it that any substantial attempts to open it would cause it to break and thereby give evidence of tampering.

Variations in structural details of the tool obviously may be made without departing from the invention as set forth in the following claims.

I claim:

1. In a sealing tool having opposed die members for the reception of a sheet material sealing element; one of said die members having a pair of supporting ledges and a pair of curved seats, the units of each of said pairs being separated by a central channel, the other one of said die members having a pair of opposing surfaces in opposition to said pair of curved seats, and having a center punch located intermediate said pair of opposing surfaces in the plane of said central channel; and means to move said die members one with relation to the other.

2. In a sealing tool having opposed die supporting members supported for translational sliding of one of said members in relation to the other of said members and means for causing such sliding relative movement; two opposed dies, each carried fixedly upon a different one of said die-supporting members, one of said dies having a supporting ledge and a pair of spaced, curved seats adjoining said ledge, said pair of seats being curved about a common axis of curvature, the units of said pair of seats being separated by a central recess, the other of said dies having a pair of spaced, opposing surfaces in opposition to and adapted to coact with said curved seats to tighten portions of a seal therebetween and having, also, a central punch intermediate said opposing surfaces and adapted, upon such translational sliding, to enter said central recess.

3. In a sealing tool, the combination according to claim 2, said central punch having an angular edge portion in substantial alignment with a plane coincident with portions of said seats which are adjacent to said ledge, said punch being adapted to move to a point beyond said seats, and said angular edge portion, upon such movement, being adapted to engage and tear a portion of a seal being closed by the tool to form a substantial gap in the seal.

4. In a sealing tool, the combination according to claim 3, said other die having a tapered face, adapted to coact with an underlying portion of one of said curved seats adjacent to said supporting ledge to pinch and hold a portion of a seal between said curved seat portion and said tapered face and thereby hold the seal against bodily rotation during such tightening of portions of the seal.

5. In a sealing tool, the combination according to claim 2, said other die having a tapered face, adapted to coact with an underlying portion of one of said curved seats adjacent to said supporting ledge to pinch and hold a portion of a seal between said curved seat portion and said tapered face and thereby hold the seal against bodily rotation during such tightening of portions of the seal.

No references cited.

Dedication 2,847,675.—*Winfred M. Brooks*, West Orange, N.J. SEALING TOOL. Patent dated Aug. 19, 1958. Dedication filed Feb. 9, 1972, by the assignee, *E. J. Brooks Company*.

Hereby dedicates to the Public the term thereof remaining after Oct. 1, 1970.

[*Official Gazette July 11, 1972.*]